United States Patent Office 3,499,035
Patented Mar. 3, 1970

3,499,035
TOLUENE DIAMINE RECOVERY PROCESS
Ehrenfried H. Kober, Hamden, Philip D. Hammond, North Haven, and Wilhelm J. Schnabel, Branford, Conn., assignors to Olin Mathieson Chemical Corporation, a corporation of Virginia
No Drawing. Filed Oct. 2, 1967, Ser. No. 671,991
Int. Cl. C07c 85/16, 119/04
U.S. Cl. 260—582                    2 Claims

ABSTRACT OF THE DISCLOSURE

A process for recovering toluene diamine from toluene diisocyanate distillation residues which comprises partially hydrolyzing the residue, adding toluene diamine and heating the mixture of partially hydrolyzed residue and toluene diamine at a temperature between about 130° and 280° C. in the presence of water.

---

This invention relates to an improved process for recovering toluene diamine from toluene diisocyanate distillation residues by hydrolysis. More particularly, this invention relates to the hydrolysis of toluene diisocyanate distillation residues in the presence of toluene diamine.

In the preferred commercial process for the preparation of toluene diisocyanate, toluene diamines are phosgenated to provide the corresponding diisocyanates. Thus, a mixture of toluene diamines is dissolved in an inert solvent and reacted with phosgene at elevated temperatures to provide the desired diisocyanate. The resulting reaction mixture is then purged to remove excess phosgene and gaseous byproducts prior to recovering the toluene diisocyanates by distillation. While providing the desired toluene diisocyanates, this process is unsatisfactory in that substantial amounts of undesirable byproducts such as polymerized isocyanates, high molecular weight ureas, cyclic ureas, etc., are also obtained. The formation of substantial amounts of these byproducts decreases the yield of toluene diisocyanate and affects the economics of the process.

A common and practical approach to the improvement of the aforementioned process involves hydrolysis of the distillation residue in order to recover the toluene diamine starting material, which can then be used to provide the diisocyanate. However, previous attempts to hydrolyze toluene diisocyanate distillation residues have not been totally acceptable.

For example, hydrolysis with water at atmospheric pressure and ordinary temperatures effects only partial hydrolysis of these residues. Thus, while the polymerized isocyanates are converted to ureas by such hydrolysis, the desired toluene diamines are not obtained and more stringent hydrolysis conditions are required to complete the hydrolysis. To illustrate, U.S. Patent 3,128,310 reports the recovery of amines by heating distillation residues with water at 160° to 250° C. employing pressure equipment. The use of superheated steam at temperatures of 200° to 400° C. to hydrolyze distillation residues is disclosed in 3,225,094. While providing the desired toluene diamines, these processes are subject to a disadvantage in that pressure equipment with the attendant controls must be employed, thereby adding to the costliness of a commercial operation.

Now it has been found that toluene diamines can be recovered from toluene diisocyanate distillation residues by hydrolysis at atmospheric pressure and in the absence of any catalyst. According to the process of this invention, hydrolysis is effected by employing toluene diamine as the hydrolysis medium in a convenient two-step process.

More specifically, the previously described toluene diisocyanate distillation residue is partially hydrolyzed with water to convert the polymerized isocyanate to ureas. If desired, a small amount of alkali metal hydroxide can be employed in this step, e.g., 0.1 to 2.0 percent by weight based on the water, in order to neutralize any chlorine present in the system, and hydrolysis conditions are not critical. Thus, while any proportions of water and residue can be employed, it is preferred to use an excess of water in order to complete hydrolysis in as short a time as possible. Generally, temperatures of about 60° to 100° C. are employed, and the completion of the partial hydrolysis is evidenced by cessation of carbon dioxide evolution from the reaction mixture.

In the second step of this process, the partially hydrolyzed residue is mixed with toluene diamine, heated to dissolve the residue, and then reacted at a temperature of about 130° to 280° C. in order to convert the partially hydrolyzed residue to toluene diamine.

Since hydrolysis takes place at temperatures above the boiling point of water, it is preferable to remove some of the excess water either by distillation or by filtration prior to heating with toluene diamine at elevated temperatures. Thus, preferred embodiments of this invention contemplate final hydrolysis employing sufficient water to maintain refluxing of the toluene diamine at the specified hydrolysis temperature. If desired, water can be continuously fed in small portions into the refluxing reaction mixture. Hydrolysis is completed when carbon dioxide evolution ceases, and the desired toluene diamine can be readily recovered by conventional techniques such as distillation.

By the term toluene diamine in the claims and specification herein is meant to include 2,4-toluene diamine; 2,6-toluene diamine and mixtures thereof. While other high boiling aromatic diamines can also be suitably employed as the hydrolysis medium for this invention, toluene diamine is preferred since it is identical with the desired product, thereby obviating the necessity for separating a mixture of amines.

The process of this invention is particularly suited to a continuous commercial operation. Thus, after removal of toluene diisocyanate by distillation, the residue, which is preferably powderized, is fed to a stirred reactor, mixed with water and heated to effect partial hydrolysis. The partially hydrolyzed residue is separated from any excess water and passed into a second reactor, mixed with toluene diamine and heated at the specified temperatures. The toluene diamine can be removed continuously by distillation and recycled to the starting reactor to undergo phosgenation to provide the desired toluene diisocyanate. Intermittently, the nonhydrolyzable materials derived from o-toluene diamine are removed and discarded. Of course, many embodiments of this process are contemplated, and the previous description is not to be considered as limiting the application of this invention.

The toluene diamine recovered according to the process of this invention is a valuable industrial chemical. In its most important application it is phosgenated as described above to provide toluene diisocyanate, which is then reacted with a polyether polyol in the presence of a reaction catalyst and a blowing agent to provide polyurethane foams. These foams are widely used for various applications such as packaging, upholstery and the like.

The following example will serve to illustrate the practice of this invention.

EXAMPLE

Toluene diamine comprising about 80 percent 2,4-toluene diamine and 20 percent of the 2,6-isomer was dissolved in o-dichlorobenzene and charged to a reactor. After continuous phosgenation at 125–130° C. for about 2.5 hours, the reaction mixture was fed to a purge column. The excess phosgene and hydrogen chloride by-product were purged with nitrogen and the o-dichlorobenzene solvent removed by distillation. The bottoms from the purge column were fed to an evaporator stripper and toluene diisocyanate, comprising a mixture of the 2,4- and 2,6-isomers, was removed by distillation.

A 125-gram portion of the distillation residue was withdrawn from the bottom of the evaporator stripper and hydrolyzed with 250 ml. of 0.7 percent aqueous sodium hydroxide at 70–80° C. in a 1.0 liter stirred reactor. After evolution of carbon dioxide had ceased, the hydrolyzed residue was isolated by filtration, mixed with 171 grams of toluene diamine, and distilled to remove excess water. The mixture of partially hydrolyzed residue and toluene diamine was then charged to a 1000 ml. three-neck flask equipped with thermometer, reflux condenser and gas outlet tube connected to a wet test meter, and heated with stirring at 180–200° C. while adding water in small portions in order to maintain a mild reflux. After 18 hours, 9.2 liters of carbon dioxide had evolved. Distillation of the reaction mixture revealed that 34.1 grams of a mixture of 2,4- and 2,6-toluene diamine had been obtained from the residue.

What is claimed is:

1. In the process for the preparation of toluene diamine by hydrolysis of the residue obtained while distilling the product of the phosgenation of toluene diamine, the improvement which comprises
   (a) partially hydrolyzing said residue at a temperature between about 60°–100° C. to convert undistillable isocyanates to ureas;
   (b) mixing said partially hydrolyzed residue with toluene diamine; and
   (c) heating said mixture of partially hydrolyzed residue and toluene diamine at a temperature between about 130° and 280° C. in the presence of water, thereby converting said residue to toluene diamine, and recovering aggregated toluene diamine from said reaction mixture.

2. The process of claim 1 wherein water is removed from said partially hydrolyzed residue prior to mixing with said toluene diamine.

References Cited
UNITED STATES PATENTS 3,128,310  4/1964  Koch _____ 260—582
3,225,094  12/1965  Wolf _____ 260—582 X CHARLES B. PARKER, Primary Examiner R. L. RAYMOND, Assistant Examiner U.S. Cl. X.R.

260—453